United States Patent [19]
Szczepanski et al.

[11] 3,917,723
[45] Nov. 4, 1975

[54] PROCESS FOR THE CONTINUOUS MANUFACTURE OF M-CHLORONITROBENZENE FROM M-DINITROBENZENE

[75] Inventors: Norbert Szczepanski; Konrad Baessler, both of Frankfurt am Main, Germany

[73] Assignee: Hoechst Aktiengesellschaft, Frankfurt am Main, Germany

[22] Filed: Nov. 12, 1973

[21] Appl. No.: 414,632

[30] Foreign Application Priority Data
Nov. 16, 1972 Germany ...................2256167

[52] U.S. Cl................................. 260/646; 260/694
[51] Int. Cl.²......................................... C07C 79/12
[58] Field of Search.................................... 260/646

[56] References Cited
OTHER PUBLICATIONS

Urbanski, Chemistry and Technology of Explosives, Vol. 1, 1964, The MacMillan Co., New York, pp. 236 to 240.

*Primary Examiner*—Leland A. Sebastian
*Attorney, Agent, or Firm*—Connolly and Hutz

[57] ABSTRACT

Preparation of m-chloronitrobenzene by partial chlorinating denitration of m-dinitrobenzene with chlorine under normal or reduced pressure at elevated temperatures.

7 Claims, No Drawings

PROCESS FOR THE CONTINUOUS MANUFACTURE OF M-CHLORONITROBENZENE FROM M-DINITROBENZENE

The present invention relates to a process for the continuous manufacture of m-chloronitrobenzene by partial chlorinating denitration of m-dinitrobenzene.

In industry m-chloronitrobenzene, which is a known intermediate for the manufacture of dyestuffs and herbicides, is produced almost exclusively by chlorinating nitrobenzene with gaseous chlorine in the presence of catalysts. In order to maintain at a low level the formation of by-products, such as o- and p-chloronitrobenzene and above all higher chlorinated nitrobenzenes, about 50 to 60 % only of the nitrobenzene used are chlorinated. To obtain the pure product a fractional distillation of the crude product is necessary with subsequent crystallization (cf. BIOS, volume 986, pages 101 – 102). The process is technically complicated and not satisfactory fron an economical point of view.

Halogenated aromatic compounds can be obtained by replacing nitro groups in the nucleus by halogen atoms. This reaction of exchange generally takes place at high temperatures (cf. Houben-Weyl 10/1, page 880). In industry use is made of this reaction in the manufacture of m-dichlorobenzene (BIOS, volume 986 I, page 151) wherein gaseous chlorine is introduced into molten m-dinitrobenzene. The formed m-dichlorobenzene together with rather considerable amounts of m-chloronitrobenzene, starting product, chlorine, hydrogen chloride and nitrous gases are distilled off from the reaction vessel over a small column. Although this chlorinating denitration starts at about 180°C, a reaction temperature of about 220°C is chosen so that the formed m-dichlorobenzene having a boiling point of 172°C can distill off immediately.

It is the object of the present invention to carry out the chlorinating denitration of m-dinitrobenzene in such a manner that the m-chloronitrobenzene formed as intermediate in the manufacture of m-dichlorobenzene can be isolated as the main product, i.e. that the amount of dichlorobenzene formed is as small as possible.

It has now been observed that at atmospheric pressure a temperature increase in the continuous chlorinating denitration favors the formation of the monochloro derivative, i.e. of m-chloronitrobenzene. This surprising temperature effect could also be ascertained at reduced pressure.

It has also been found that with continuous introduction of chlorine into the melt of m-dinitrobenzene and with continuous separation of the reaction products by distillation under a pressure of from about 250 torr to atmospheric pressure the chlorinating denitration of m-dinitrobenzene yields m-chloronitrobenzene as the principal reaction product provided that the pressure of the system is inferior to the vapor pressure of m-chloronitrobenzene but superior to the vapor pressure of m-dinitrobenzene at the respective temperature.

A temperature increase of 10°C in the continuous chlorinating denitration corresponds to an increase in the m-chloronitrobenzene content in the distillate by about 3 to 4 %, but simultaneously a greater amount of unreacted chlorine leaves the reaction mixture. Thus, at a reaction temperature of 280°C the distillate contains 78 % of m-chloronitrobenzene. At atmospheric pressure the process is preferably carried out at a temperature of from 235° to 280°C, more preferably 260° to 275°C.

It is likewise possible to perform the process at elevated pressure; in this case, however, the apparatus used must be pressure-resistant. Moreover, with increasing pressure higher and higher temperatures are required for the distillation of the m-chloronitrobenzene. Besides a better degree of utilization of chlorine no other advantage is achieved.

During chlorination the reaction products are best separated over a column in order that a small amount only of starting product distills over. The design of the column is not critical. With a low separating effect or when the reaction is carried out without using a column, the proportion of starting product in the distillate will increase, but this influences but little the ratio of m-chloronitrobenzene to m-dichlorobenzene.

The reaction can be carried out with advantage also under reduced pressure provided that the temperature is sufficiently high for the starting of the reaction and the vacuum is such that the starting product does not yet boil. It is necessary, of course, to adapt temperature and vacuum to each other in such a manner that the formed m-chloronitrobenzene can distill off.

A further limitation of the vacuum to be applied, which is of economic nature, is the fact that a reduction in pressure reduces the conversion of chlorine, i.e. increases the portion of unreacted chlorine. In practice, the lower limit of the vacuum to be applied is, therefore, about 250 torr. The range within which the continuous chlorinating denitration is suitably carried out is between 250 torr and atmospheric pressure, however the pressure of the system should be smaller than the vapor pressure of m-chloronitrobenzene but higher than the vapor pressure of m-dinitrobenzene at the respective temperature.

The vapor pressure values of m-dinitrobenzene are published in "Dictionary of Organic Compounds", 4th edition, London 1965, volume 3, page 1240.

The vapor pressure values of m-chloronitrobenzene were determined by experiments as follows:

| | | | |
|---|---|---|---|
| 160°C | 94 torr | 220°C | 530 torr |
| 170°C | 130 torr | 230°C | 680 torr |
| 200°C | 320 torr | 235°C | 760 torr |

The chlorinating denitration of m-dinitrobenzene starts at a temperature below 200°C, but an economically interesting reaction speed is obtained from 220°C onward only.

The reaction temperature should advantageously not exceed 280°C as at higher temperature (from about 300°C onward) the danger exists that m-dinitrobenzene decomposes with explosion. Furthermore, the degree of conversion of the introduced chlorine will diminish.

It has proved especially advantageous to carry out the reaction in a pressure/temperature range determined by the following equations 1 to 3 wherein T is the reaction temperature in degrees centigrade and p the pressure of the system in torr $$1) \quad p \geq 300 + 8 \cdot (T-250)$$
$$2) \quad 600 \geq p \geq 250$$
$$3) \quad 280 \geq T \geq 230$$

A temperature of from 230° to 240°C and a pressure of from 330 to 350 torr gives particularly good results.

The following examples illustrate the invention.

EXAMPLE 1

A device consisting of a stirring flask (useful volume 1100 ml), provided with a chlorine inlet tube reaching down to the bottom, an air bath heating, a heatable dropping funnel, a fractionating column with mirror coated inner surface (about 20 theoretical plates) with distillation bridge and reflux condenser and a collecting vessel, was filled with m-dinitrobenzene up to the marking (1100 ml).

After heating to 275°C, 0.67 mole /hour of chlorine (about 250 ml/minute) were introduced and simultaneously 141 g/h of molten m-dinitrobenzene were dropped in. With this rate of addition the volume in the reaction vessel remained constant and 125 g of chlorination mixture distilled off per hour. The temperature in the bottom was maintained at 275° + 2°C. The beginning of the reaction was recognized by the development of nitrous gases which passed, together with the unreacted portions of gaseous chlorine, through the reflux condenser into an absorption device. The collecting distillate (boiling point 205° –220°C) was washed until it was neutral (for gas-liquid chromatographic analysis (GLC)).

Duration of experiment: 60 hours
Composition of distillate:
76 % of m-chloronitrobenzene
11 % of m-dichlorobenzene
12 % of m-dinitrobenzene The bottom product of the reaction remained substantially constant in its composition and on the average it consisted of
91.5 % of m-dinitrobenzene
7.5 % of m-chloronitrobenzene and about
1 % of higher chlorinated constituents.

EXAMPLE 2

The device used was the same as in Example 1.

The flask with stirrer was charged up to the marking (1100 ml) with m-dinitrobenzene and in the reflux condenser a vacuum of 330 torr was produced. After heating to 230°C, 0.67 mole/hour of chlorine (about 250 ml/min of gaseous chlorine) was introduced and simultaneously 112 g/hour of molten m-dinitrobenzene were dropped in. With this amount of addition the volume in the reaction vessel remained constant and 108 g of chlorination mixture distilled off per hour. After about 45 minutes the transition temperature of 168° to 170°C was reached and the reaction product distilled over continuously. The distillate was washed until neutral to eliminate acid constituents. Over a duration of the experiment of 60 hours the neutral distillate had the following composition:
85.0 % of m-chloronitrobenzene
14.0 % of m-dichlorobenzene
<1.0 % of m-dinitrobenzene and higher chlorinated constituents The composition of the bottom product of the reaction remained substantially constant, on the average it was composed of (GLC):
90.0 % of m-dinitrobenzene
9.0 % of m-chloronitrobenzene
1.0 % of higher chlorinated constituents By a single fractionation the distillate could be separated into chloronitrobenzene and m-dichlorobenzene having a purity of over 99 %.

What is claimed is:

1. A process for the manufacture of m-chloronitrobenzene by partial chlorinating denitration of m-dinitrobenzene, which comprises continuously introducing chlorine into a melt of m-dinitrobenzene under a pressure of 250 torr to atmospheric pressure and continuously separating the reaction products, the pressure of the system being smaller than the vapor pressure of m-chloronitrobenzene but greater than the vapor pressure of m-dinitrobenzene.

2. The process of claim 1, wherein the denitration is carried out under reduced pressure.

3. The process of claim 2, wherein the temperature is in the range of from 220° to 280°C.

4. The process of claim 1, wherein the pressure is in the range of from 330 to 350 torr and the temperature is in the range of from 230° to 240°C.

5. The process of claim 1, wherein the pressure is atmospheric pressure and the temperature is in the range of from 235° to 280°C.

6. The process of claim 5, wherein the temperature is 260° to 275°C.

7. The process of claim 1, wherein the denitration is carried out in a pressure/temperature range defined by the equations $$600 \geq p \geq 300 + 8 \cdot (T-250)$$
$$600 \geq p \geq 250$$
$$280 \geq T \geq 230$$

in which T stands for the reaction temperature in degrees centigrade and $p$ means the pressure of the system in torr.